(12) United States Patent
Sakamoto

(10) Patent No.: US 8,422,839 B2
(45) Date of Patent: Apr. 16, 2013

(54) OPTICAL FIBER-TYPE OPTICAL FILTER

(75) Inventor: Akira Sakamoto, Sakura (JP)

(73) Assignee: Fujikura Ltd., Tokyo (JP)

(*) Notice: Subject to any disclaimer, the term of this patent is extended or adjusted under 35 U.S.C. 154(b) by 234 days.

(21) Appl. No.: 13/053,758

(22) Filed: Mar. 22, 2011

(65) Prior Publication Data
US 2011/0235969 A1    Sep. 29, 2011

(30) Foreign Application Priority Data
Mar. 24, 2010 (JP) ................. 2010-068588

(51) Int. Cl.
*G02B 6/26* (2006.01)

(52) U.S. Cl.
USPC .............. 385/28; 385/123; 385/126; 385/127

(58) Field of Classification Search .................. 385/123, 385/124, 125, 126, 127, 128, 27, 28, 140
See application file for complete search history.

(56) References Cited

U.S. PATENT DOCUMENTS

| | | | |
|---|---|---|---|
| 6,404,966 B1 | 6/2002 | Kawanishi et al. | |
| 6,845,204 B1 | 1/2005 | Broeng et al. | |
| 7,260,299 B1* | 8/2007 | Di Teodoro et al. | 385/123 |
| 7,379,648 B1* | 5/2008 | Brooks et al. | 385/126 |
| 2004/0175084 A1 | 9/2004 | Broeng et al. | |
| 2008/0050078 A1 | 2/2008 | Digonnet et al. | |
| 2011/0235969 A1* | 9/2011 | Sakamoto | 385/28 |

FOREIGN PATENT DOCUMENTS

| | | |
|---|---|---|
| JP | 56-128904 A | 10/1981 |
| JP | 2000-35521 A | 2/2000 |
| JP | 2007-304336 A | 11/2007 |
| WO | 03/019257 A1 | 3/2003 |
| WO | 2007/057024 A2 | 5/2007 |
| WO | 2007/068244 A1 | 6/2007 |

OTHER PUBLICATIONS

A. Wang et al., "Three-level neodymium fiber laser incorporating photonic bandgap fiber", Optics Letters Vo. 31, No. 10, May 15, 2006, pp. 1388-1390.
Bo-Wen Liu et al., "Tunable Bandpass Filter With Solid-Core Photonic Bandgap Fiber and Bragg Fiber", IEEE Photonics Technology Letters, vol. 20, No. 8, Apr. 15, 2008, pp. 581-583.

* cited by examiner

*Primary Examiner* — Brian Healy
(74) *Attorney, Agent, or Firm* — Sughrue Mion, PLLC

(57) ABSTRACT

An optical fiber-type optical filter includes: two fiber regions, namely, the first and second PBGF regions, each of which includes: a core section extending in a waveguide direction of incident light; and a clad section extending in the waveguide direction and surrounding the core section, wherein the clad section includes a plurality of high rods which have a refractive index higher than that of a base material of the clad section, extend in the waveguide direction, and are arranged periodically in a cross section perpendicular to the waveguide direction, and a light loss region between mutually-facing end surfaces of the first and second fiber regions, for coupling a radiation mode with a waveguide mode in which light intensity is observed in the high refractive-index sections in the clad section.

16 Claims, 6 Drawing Sheets

Glass is locally heated by $CO_2$ gas laser, electric discharge etc.

US 8,422,839 B2

OPTICAL FIBER-TYPE OPTICAL FILTER

This Nonprovisional application claims priority under 35 U.S.C. §119(a) on Patent Application No. 2010-068588 filed in Japan on Mar. 24, 2010, the entire contents of which are hereby incorporated by reference.

TECHNICAL FIELD

The present invention relates to an optical fiber-type optical filter, particularly to an optical fiber-type optical filter employing a photonic band gap fiber.

BACKGROUND ART

A PBGF (photonic band gap fiber) is an optical fiber including a clad section in which a refractive-index distribution in a cross section perpendicular to a light waveguide direction exhibits two-dimensional periodicity. The periodic structure of the refractive-index distribution forms photonic band gaps. The formation of the photonic band gaps realizes a selective wavelength characteristic, thereby keeping light with a specific wavelength corresponding to the periodic structure within a core section, or, on the contrary, removing light with a specific wavelength from the core section. Use of this characteristic of the PBGF realizes an optical filter (optical fiber-type optical filter).

Conventional PBGFs are mainly divided into two types, namely, holey fiber types and solid types.

In a holey fiber PBGF, the periodic structure is realized by arranging a plurality of holes. In a solid PBGF, on the other hand, the periodic structure is realized by arranging a plurality of high refractive-index sections. The high refractive-index sections are portions having a refractive index higher than that of quartz used as a base material of the optical fiber. Particularly, in a case of a solid PBGF in which a core section has a high refractive index and a waveguide structure, an optical filter can be produced with a function of removing, from the core section, light with a specific wavelength corresponding to the periodic structure.

Patent Literatures 1 to 6 disclose techniques related to these conventional PBGFs. Particularly, Patent Literature 6 discloses a technique of using, as a fiber for amplification of light, an optical fiber-type optical filter employing a conventional PBGF.

CITATION LIST

Patent Literature 1
Japanese Patent Application Publication, Tokukai, No. 2000-35521 A (Publication Date: Feb. 2, 2000)
Patent Literature 2
US Patent Publication No. 2004/175084 (Publication Date: Sep. 9, 2004)
Patent Literature 3
International Publication No. 2003/019257, [Publication Date: Mar. 6, 2003]
Patent Literature 4
U.S. Pat. No. 6,845,204 [Registration Date: Jan. 18, 2005]
Patent Literature 5
Japanese Patent Application Publication, Tokukaisho, No. 56-128904 A (Publication Date: Oct. 8, 1981)
Patent Literature 6
International Publication No. 2007/057024, [Publication Date: May 24, 2007]

SUMMARY OF INVENTION

Technical Problem

In the solid PBGF, due to mode coupling to couple a waveguide mode in which light intensity is concentrated in the core section and a waveguide mode in which the light intensity is also distributed (present) in the high refractive-index sections in the clad section, light guided in the core section diffuses to the high refractive-index sections in the clad section. Because of this, the intensity of the light guided in the core section is gradually attenuated as the light propagates in the waveguide direction. Here, a wavelength band of the light, which wavelength band is attenuated in the core section is called a stop band (in other words, the stop band is that wavelength band of light, which is to be subject to transmission loss). However, when the light travels from the end section on the light-incident side by a specific length, light with a predetermined intensity travels also in the high refractive-index sections in the clad section, so that there is a balance between the intensity of light coupled from the core section to the high refractive-index sections in the clad section and the intensity of light coupled from the high refractive-index sections in the clad section to the core section. Consequently, the intensity of the light traveling in the core section becomes constant irrespective of the length.

Therefore, an optical fiber-type optical filter produced from a PBGF as disclosed in the Patent Literatures 1 to 6 faces such a problem that use of the PBGF with long enough total length simply results in saturation of the transmission loss of the light in the stop band in the core section. Thus, it was difficult to obtain an optical filter with a high wavelength selectivity with this configuration.

The present invention is accomplished in view of the aforementioned problem. An object of the present invention is to provide an optical fiber-type optical filter capable of causing a high transmission loss of light within the stop band traveling in the core section.

Solution to Problem

In order to attain the object, an optical fiber-type optical filter according to the present invention is an optical fiber-type optical filter including: two fiber regions, each of which includes: a core section extending in a waveguide direction of incident light; and a clad section extending in the waveguide direction and surrounding the core section, wherein the clad section includes a plurality of high refractive-index sections which have a refractive index higher than that of a base material of the clad section, extend in the waveguide direction, and are arranged periodically in a cross section perpendicular to the waveguide direction, and a light loss region between mutually-facing end surfaces of the two fiber regions, for coupling a radiation mode with a waveguide mode in which light intensity is observed in the high refractive-index sections in the clad section.

According to the configuration above, each of the two fiber regions is a region constituting a so-called solid PBGF (photonic band gap fiber).

In the solid PBGF, due to mode coupling to couple a waveguide mode in which light intensity is concentrated in the core section and a waveguide mode in which the light intensity is also distributed (present) in the high refractive-index sections in the clad section (the wavelength at which the mode coupling occurs depends on the periodicity of the refractive-index distribution of the PBGF), light guided in the core section diffuses to the high refractive-index sections in the clad section. Because of this, the intensity of the light guided in the core section is gradually attenuated as the light propagates in the waveguide direction. Here, a wavelength band of the light, which wavelength band is attenuated in the core section is called a stop band.

Therefore, although the light guided in the core section in one of the fiber regions, the fiber region being on the light-incident side, is gradually attenuated as the light propagate in the waveguide direction immediately after entering the fiber region, light with a predetermined intensity travels also in the high refractive-index sections in the clad section when the light travels from the end portion on the light-incident side by a specific waveguide length, so that there is a balance between the intensity of light coupled from the core section to the high refractive-index sections in the clad section and the intensity of light coupled from the high refractive-index sections in the clad section to the core section. Consequently, the intensity of the light traveling in the core section becomes constant irrespective of the length. As a result, the transmission loss of light within the stop band and traveling in the core section becomes saturated.

Based on this, the optical fiber-type optical filter according to the present invention employs a configuration in which a light loss region is provided between mutually-facing end surfaces of two fiber regions.

Provision of such light loss region between the two fiber regions causes light having propagated in high refractive-index sections in the clad section in one of the fiber regions, the fiber region being on the light-incident side, to be lost in the light loss region.

Consequently, after the light within the stop band enters from one of the fiber regions on the light-incident side to the light loss region, the balance between the intensity of light coupled from the clad section to the core section and the intensity of light coupled from the core section to the clad section is lost. Because of this, light in the high refractive-index sections in the clad section has a reduced intensity immediately after the light within the stop band enters from the light loss region to the other fiber region, so that more light coupled from the core section to the high refractive-index sections newly generates. As a result, the intensity of the light guided in the core section in the other fiber region will be further reduced. That is, it becomes possible to increase the transmission loss of the light within the stop band traveling in the core section.

In this manner, the transmission loss of the light within the stop band traveling in the core section can be increased.

Advantageous Effects of Invention

As described above, the optical fiber-type optical filter according to the present invention includes: two fiber regions, each of which includes: a core section extending in a waveguide direction of incident light; and a clad section extending in the waveguide direction and surrounding the core section, wherein the clad section includes a plurality of high refractive-index sections which have a refractive index higher than that of a base material of the clad section, extend in the waveguide direction, and are arranged periodically in a cross section perpendicular to the waveguide direction, and a light loss region between mutually-facing end surfaces of the two fiber regions, for coupling a radiation mode with a waveguide mode in which light intensity is observed in the high refractive-index sections in the clad section.

This makes it possible to increase the transmission loss of the light within the stop band traveling in the core section.

Additional objects, features, and strengths of the present invention will be made clear by the description below. Further, the advantages of the present invention will be evident from the following explanation in reference to the drawings.

BRIEF DESCRIPTION OF DRAWINGS

FIG. 1 is a perspective view of a basic structure of an optical fiber-type optical filter according to one embodiment of the present invention and a cross-sectional view of a cross-section orthogonally intersecting a direction in which incident light is guided.

FIG. 2(a) is a schematic view of an example of the optical fiber-type optical filter in which a region where mutually-facing end surfaces of two PBFGs are fusion-spliced to each other is a light loss region.

FIG. 2(b) is a schematic view of an example of the optical fiber-type optical filter in which a region where a normal optical fiber having a homogeneous distribution of refractive index in a clad section is interposed is a light loss region.

FIG. 3 is a schematic view of the configuration of an experimental system for measuring the transmission loss of an optical fiber-type optical filter.

FIG. 4 is a schematic view of the configuration of an optical fiber-type optical filter employing a conventional PBGF.

FIG. 5 is a graph of the measurement results of the transmission losses of optical fiber-type optical filters respectively employing one of two conventional PBGFs with different lengths.

FIG. 6(a) is a schematic view of an experiment conducted with the above experimental system in a case where an optical fiber-type optical filter of a comparative example employing a conventional PBGF is measured.

FIG. 6(b) is a schematic view of an experiment conducted in the experimental system in a case where the region where the mutually-facing end surfaces of the two PBFGs are fusion-spliced to each other is a light loss region.

FIG. 6(c) is a schematic view of an experiment conducted in the experimental system in a case where the normal optical fiber having a homogeneous distribution of refractive index in the clad section is interposed is a light loss region.

FIG. 7 is a graph of the measurement results of the transmission losses in the respective cases of FIGS. 6(a) to 6(c).

FIG. 8 is a graph of the relation between the coating length and the change in transmittance of the interposed normal optical fiber having a homogeneous distribution of refractive index in the clad section in regard to the optical fiber-type optical filter.

FIG. 9 is a graph of the relation between the PBGF length and the transmittance in regard to the optical fiber-type optical filter.

FIG. 10(a) is a schematic view of the configuration of an optical fiber-type optical filter employing a conventional PBGF.

FIG. 10(b) is a schematic view of the configuration of the optical fiber-type optical filter according to the present invention in which a region where the constituent medium of the PBGF has altered is a light loss region.

FIG. 11(a) is a graph of the refractive-index distribution in the cross-section taken along the line A-A' of the optical fiber-type optical filter in FIG. 10(a).

FIG. 11(b) is a graph of the refractive-index distribution in the cross-section taken along the line A-A' in a case where only the refractive-index distribution in the surroundings of the high refractive-index sections in the optical fiber-type optical filter is changed.

FIG. 11(c) is a graph of the refractive-index distribution of the cross-section taken along the line A-A' in a case where the refractive-index distribution in the surroundings of the high refractive-index sections, the core section, and the surroundings of the core section is changed.

DESCRIPTION OF EMBODIMENTS

One embodiment of the present invention will be described with reference to FIGS. 1 to 11(c). It should be noted that descriptions on configurations other than the configurations described in the specific items below may be omitted but will be understood to be the same as the configurations described in the other items. For easy explanation, the same reference number will be given to a member having the same function as a member described in the items, and descriptions on such member will be omitted.

[1. Basic Structure and Production Method of Optical Fiber-type Optical Filter]

First, referring to FIG. 1, a description will be given on a basic structure of an optical fiber-type optical filter (optical fiber-type optical filter 10) according to one embodiment of the present invention.

Figure 1:
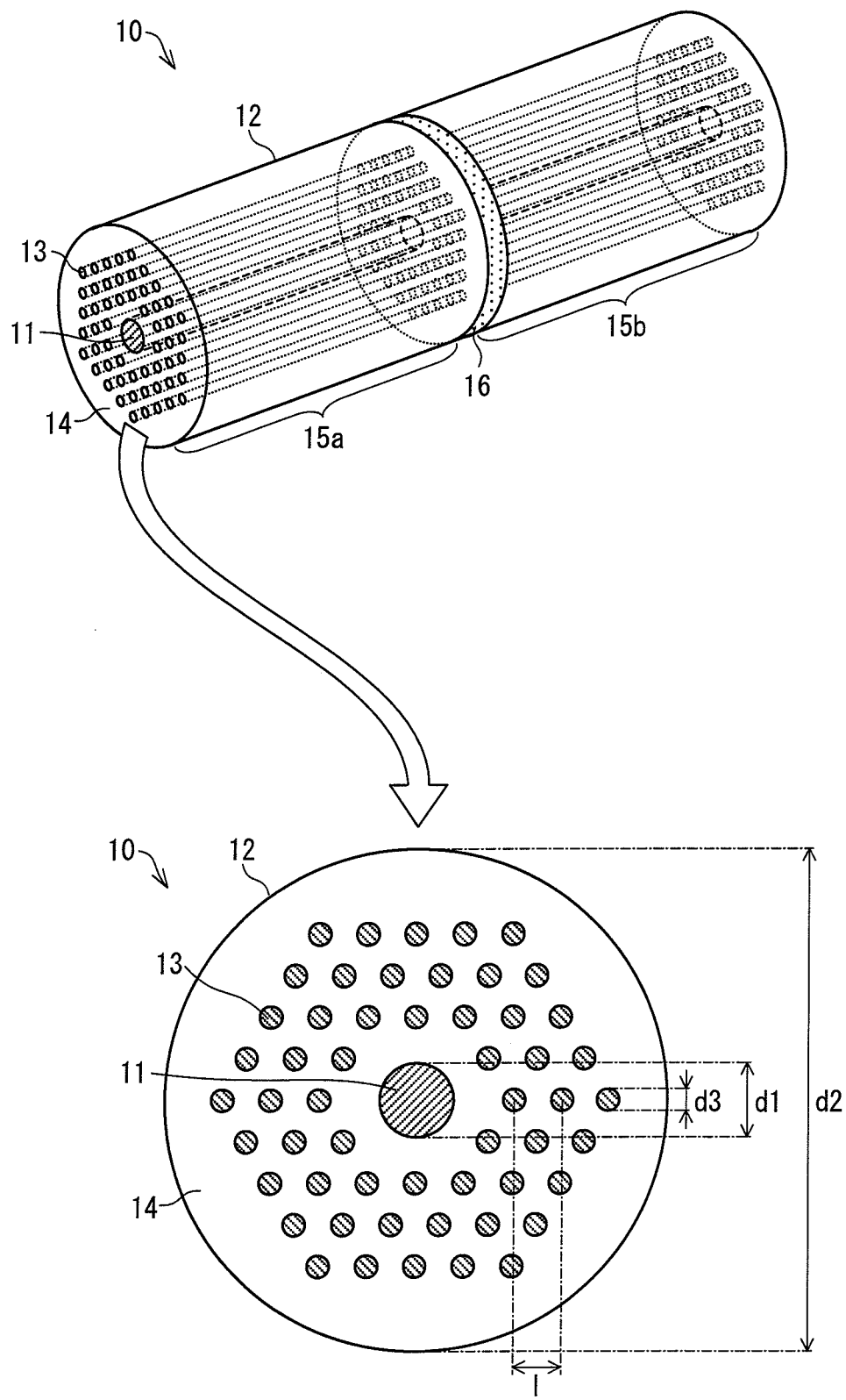
FIG. 1

FIG. 1 is a perspective view of the structure of an optical fiber-type optical filter 10, as well as a cross-sectional view of a cross-section orthogonally intersecting the direction in which incident light is guided (the direction from the lower left side to the upper right side of FIG. 1).

As illustrated in FIG. 1, the optical fiber-type optical filter 10 has a basic structure which includes a core section 11 having the substantially circular cross-section and extending in the waveguide direction and a clad section 12 having the substantially annular cross-section and extending in the waveguide direction so as to surround the core section 11.

The optical fiber-type optical filter 10 is divided into three regions, namely, a first PBGF region (fiber region) 15a, which is one of two fiber regions, a light loss region 16, and a second PBGF region (fiber region) 15b, which is the other of the two fiber regions. Each of the first and second PBGF regions 15a, 15b is a region constituting a so-called solid PBGF.

In this embodiment, the core section 11 in each of the first PBGF region 15a, light loss region 16, and second PBGF region 15b is mainly made from quartz (silica dioxide: $SiO_2$) and is doped with germanium (Ge) for the purpose of attaining a high refractive index, thereby realizing a relative refractive index difference to quartz. The dopant according to the present invention is not limited to germanium.

Next, each of the clad sections 12 in the first and second PBGF regions 15a, 15b includes a plurality of rods (high refractive-index sections) 13 with a high refractive index, the rods 13 extending in the waveguide direction and arranged periodically at rod intervals (predetermined intervals) 1, and a background medium (base material) 14 with a low refractive index, the background medium 14 extending in the waveguide direction and filling the gaps between the plurality of rods 13. The refractive-index distribution in a cross-section of the clad section 12 periodically changes due to the plurality of rods 13 and background medium 14, thereby forming a photonic band gap.

Owing to this, it becomes possible to realize a selective wavelength characteristic such as keeping light with a specific wavelength corresponding to the periodic structure within the core section 11 or, on the contrary, removing light with a specific wavelength from the core section 11. By utilizing such characteristic of the first and second PBGF regions 15a, 15b, it is possible to realize an optical filter (optical fiber-type optical filter). The values of a rod diameter d3 of the rod 13 and a rod gap 1 are appropriately set so as to obtain a desired filter characteristic.

Due to the periodic structures formed in the first and second PBGF regions 15a, 15b, it becomes possible to remove light with a specific wavelength corresponding to the periodic structure (hereinafter referred to as stop band wavelength light (light) P0) from light guided in the core section 11. To avoid complexity, the first PBGF region 15a and/or the second PBGF region 15b may be simply called PBGF(s). Here, a wavelength band of the light traveling through the core section 11, which wavelength band is attenuated in the core section 11 is called a stop band (in other words, the stop band is that wavelength band of light, which is to be subject to transmission loss).

The light loss region 16 is present between the first and second PBGF regions 15a, 15b that are arranged with the end surfaces thereof facing each other. In a case where the optical fiber-type optical filter 10 includes three or more PBGF regions, the light loss region 16 is arranged between each two adjacent PBGFs.

Next, in this embodiment, the rods 13 have substantially the same constituent material as that of the core section 11, and have a refractive index substantially equal to or higher than that of the core section 11. The background medium 14 purely consists of quartz and has a refractive index equal to that of quartz. The background medium 14 may be made from quartz doped with a dopant such as fluorine (F) so as to further decrease the refractive index of the background medium 14. Such dopant is not limited to fluorine.

It should be noted that the base material according to the present invention is not limited to quartz although the present embodiment uses quartz as the base materials of the core section 11 and clad section 12 (including the high refractive-index sections 13).

Next, the periodic arrangement of the plurality of rods 13 is constituted by triangular grid units, in which three rods 13 are arranged at the apexes of an equilateral triangle, the plurality of rods 13 being arranged to form a hexagon as a whole. The periodic arrangement of the plurality of rods 13 is not limited to this arrangement but may be any arrangement that realizes a photonic band gap structure.

It is preferable that the core diameter d1 and the refractive index of the core section 11 are selected so as to realize a single mode transmission in the wavelength region to be used. This is because having a plurality of modes to be guided in the core section 11 complexes an obtained filter characteristic, thereby making the control difficult. The core diameter d1 and the refractive index of the core section 11 according to the present invention are not limited to this, however, as long as a desired filter characteristic is obtained.

Next, it is preferable that, for wavelengths other than wavelengths to be filtered in the light loss region 16, namely, wavelengths outside the stop band (that is, for light (signal light) to be transmitted through the core section), an MFD (mode field diameter) of a waveguide mode in which the light intensity is concentrated in the core section 11 in the first or second PBGF region 15a, 15b is preferably equal to an MFD of a waveguide mode in which the light intensity is concentrated in the core section 11 in the light loss region 16.

Here, MFD generally indicates a diameter of an electric field distribution in a waveguide mode which electric field distribution is caused by light propagating in the core section in the waveguide mode.

Light outside the stop band among light guided in the optical fiber-type optical filter 10 is propagated in the optical fiber-type optical filter 10 in a waveguide mode in which the light intensity is concentrated in the core section 11. Consequently, by equalizing the MFD of a waveguide mode in which the light intensity is concentrated in the core section 11 in the first or second PBGF region 15a, 15b and the MFD of a waveguide mode in which the light intensity is concentrated in the core section 11 in the light loss region 16, it becomes possible to reduce loss of light outside the stop band (that is, it becomes possible to reduce the loss of the signal light to be emitted from the optical fiber-type optical filter 10), the loss occurring in the interface between the first PBGF region 15a and the light loss region 16 or between the second PBGF region 15b and the light loss region 16.

The PBGF other than the light loss region 16 may be a conventional PBGF and can be produced by a known method, for example, a method described in Japanese Patent Application Publication, Tokukai, No. 2007-304336 A or the like.

[2. Specific Examples 1 of Light Loss Region 16]

Next, specific examples of the light loss region 16 will be described below with reference to FIGS. 2(*a*) and 2(*b*).

Figure 2:
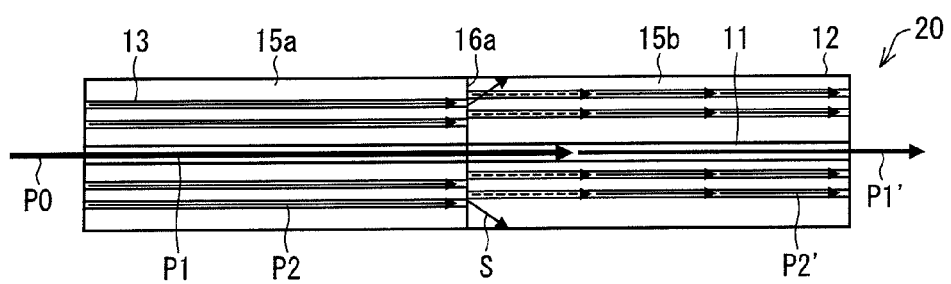
FIG. 2(a)
FIG. 2(b)
Figure 2:
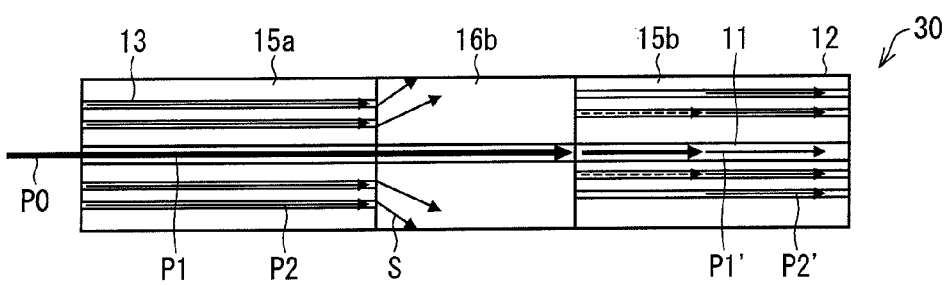

FIG. 2(*a*) is a schematic view of an exemplary configuration (an optical fiber-type optical filter 20) in which the light loss region 16 is a region where mutually-facing end surfaces of two PBFGs are fusion-spliced. FIG. 2(*b*) is a schematic view of an exemplary configuration (an optical fiber-type optical filter 30) in which the light loss region 16 a region where a normal optical fiber having a homogeneous refractive-index distribution in the clad section is interposed.

First, the optical fiber-type optical filter 20 is obtained by preparing at least two of the above-described PBGFs, then fusion-splicing the end surfaces of the PBGFs with each other so as to form a fusion-spliced section (light loss region) 16a.

As in the optical fiber-type optical filter 20, in a case where the optical loss region 16 is configured as the fusion-spliced section 16a, part of rod-guided light P2 propagating in the rods becomes radiated light due to misalignment between the rods 13 at the fusion-spliced section 16a.

Since the thickness (length) of the fusion-spliced section 16a along the waveguide direction cannot be appropriately adjusted, there is a limitation to the thickness and thus to the improvement in transmission loss. However, as shown by the measurement results to be described later, it is possible to increase the transmission loss more than that in an optical fiber-type optical filter employing a conventional PBGF.

The optical fiber-type optical filter 30 illustrated in FIG. 2(*b*) can be produced, for example, by preparing at least two of the above-described PBGFs, interposing a normal (non-PBGF) optical fiber having a homogeneous refractive-index distribution in the clad section between the PBGFs, then fusion-splicing the normal optical fiber so as to form a fiber interposition section 16b.

As in the optical fiber-type optical filter 30, in a case where the fiber interposition section 16b is the optical loss region 16, the fiber interposition section 16b is adjustable in length along the direction in which the clad section 12 extends. Therefore, if the length is set long enough, most part of the rod-guided light P2 becomes radiated light as shown in the measurement result to be described later.

As discussed above, according to the optical fiber-type optical filters 20, 30, the transmission loss of the stop band wavelength light P0 can be increased due to the loss of the rod-guided light P2.

[3. Transmission Loss Saturation Characteristics of Conventional PBGF]

Next, transmission loss saturation characteristic of a conventional PBGF will be described below with reference to FIGS. 3 to 5.

Figure 3:
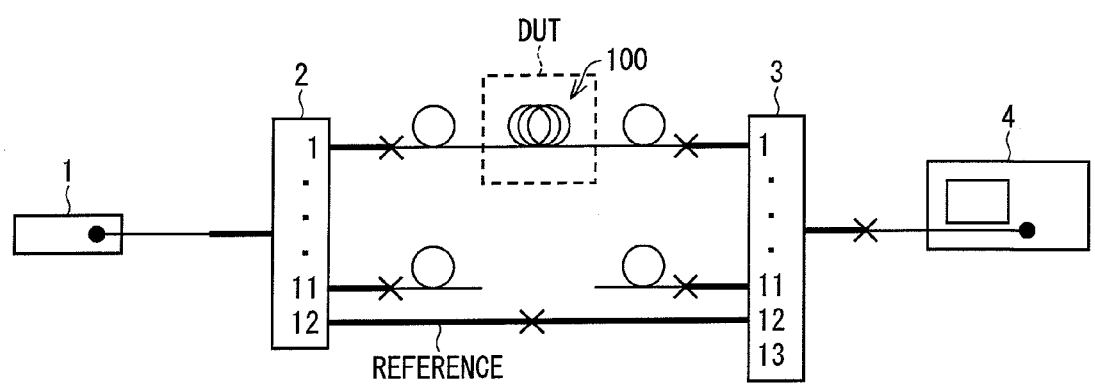
FIG. 3

FIG. 3 illustrates an example of an experimental system for measuring the transmission loss saturation characteristic.

When the output port of an optical switch 2 and the input port of an optical switch 3 are switched to DUT (Device Under Test) ports in the experimental system in FIG. 3, light from a white light source 1 travels through the fiber to be measured and enters an optical spectrum analyzer 4. On the contrary, when the output port of the optical switch 2 and the input port of the optical switch 3 are switched to reference ports, light from the white light source 1 travels through a reference fiber and enters the optical spectrum analyzer 4. Here, the transmission loss of the fiber to be measured was worked out by calculating a difference between measurement results obtained by the optical spectrum analyzer 4 respectively in the former and latter cases.

As a PBGF of a comparative example, a PBGF 100 designed to have a light loss characteristic in wavelength around 1300 nm was used. Specifically, the PBGF 100 was designed such that the diameter of the core section (core diameter d1) was 6·m, the relative refractive index difference of the core section with respect to quartz (Δ core) was 0.7%, the period of the high refractive-index sections in the clad section (rod interval 1) was 7.8 μm, the diameter of the high refractive-index sections in the clad section (clad diameter d3) was 4.5 μm, and the relative refractive index difference of the high refractive-index sections in the clad section was 2.6%. A PBGF 100 with a length of about 2 m and a PBGF 100 with a length of about 10 m were used. The entire PBGF 100 was constituted of a single PBGF (PBGF region 15).

Using this experimental system, light from the white light source 1 was transmitted through the PBGF 100 then measured at the optical spectrum analyzer 4.

Figure 5:
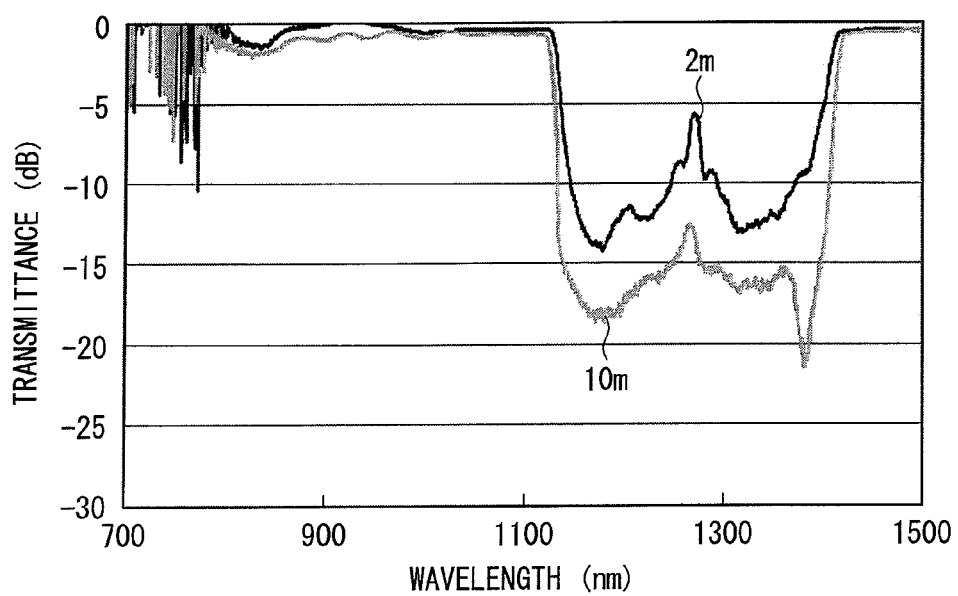
FIG. 5
Figure 6:
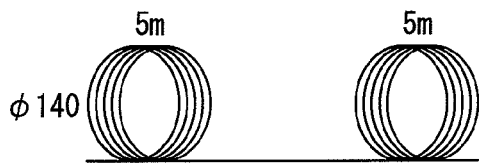
FIG. 6(a)
FIG. 6(b)
FIG. 6(c)
Figure 6:
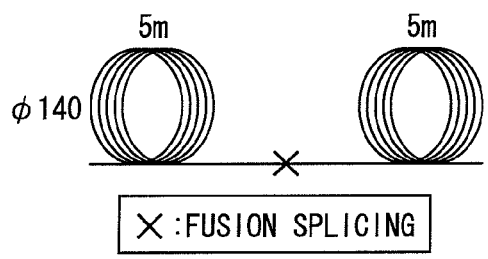
Figure 6:
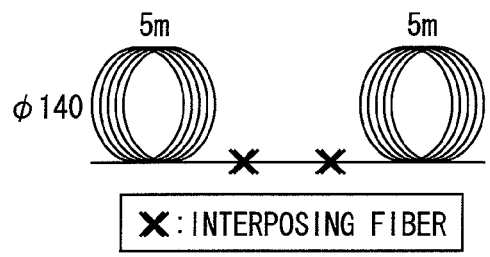

FIG. 5 shows the transmission spectra (relation between the wavelength and transmittance) in the case of a PBGF 100 with a length of about 2 m and the case of a PBGF 100 with a length of about 10 m, respectively.

In the measurement result in FIG. 5, an increase is observed in the transmission loss of light in the wavelength band ranging from about 1100 nm to about 1400 nm. This indicates the fact that light with a specific wavelength can be selectively filtered by means of the PBGFs 100.

Despite the fivefold difference in length between the PBGFs 100 used in the experiment, namely about 2 m and about 10 m, respectively, the PBGFs 100 differed from each other in transmission loss by only 1.5 times. This clearly indicates a saturation tendency.

Next, with reference to FIG. 4, an explanation will be given as to why such saturation tendency occurs. FIG. 4 is a schematic view of the configuration of a conventional optical fiber-type optical filter employing a PBGF 100.

Figure 4:
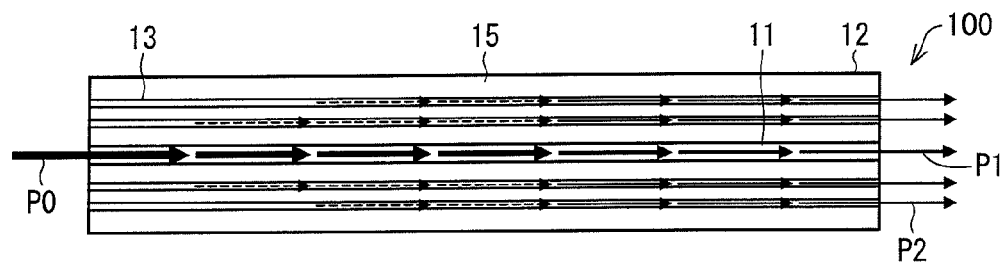
FIG. 4

As illustrated in FIG. 4, when the stop band wavelength light P0 having propagated in the core section 11 in a PBGF 100 enters a PBGF 100, part of the light enters the rods 13 around the core section 11 so as to become rod-guided light (light) P2, the wavelength of which is determined according to the periodicity of the refractive-index distribution in the clad section 12 in the PBFG 100. Here, the light remaining in the core section 11 at this time is referred to as core section-guided light (light) P1.

Immediately after the entry, the stop band wavelength light P0 guided in the core section 11 is gradually attenuated as the stop band wavelength light P0 propagates in the waveguide direction. However, when the stop band wavelength light P0 propagates by a specific length from the end portion on the incident side, light with a predetermined intensity will also propagates in the rods 13 in the clad section 12, so that there is a balance (or equilibrium) between the intensity of light coupled from the core section 11 to the rods 13 in the clad section 12 and the intensity of light coupled from the rods 13 in the clad section 12 to the core section 11. Consequently, the intensity of the light traveling in the core section becomes constant irrespective of the length. As a result, the transmission loss of the stop band wavelength light P0 traveling in the core section 11 becomes saturated.

Figure 9:
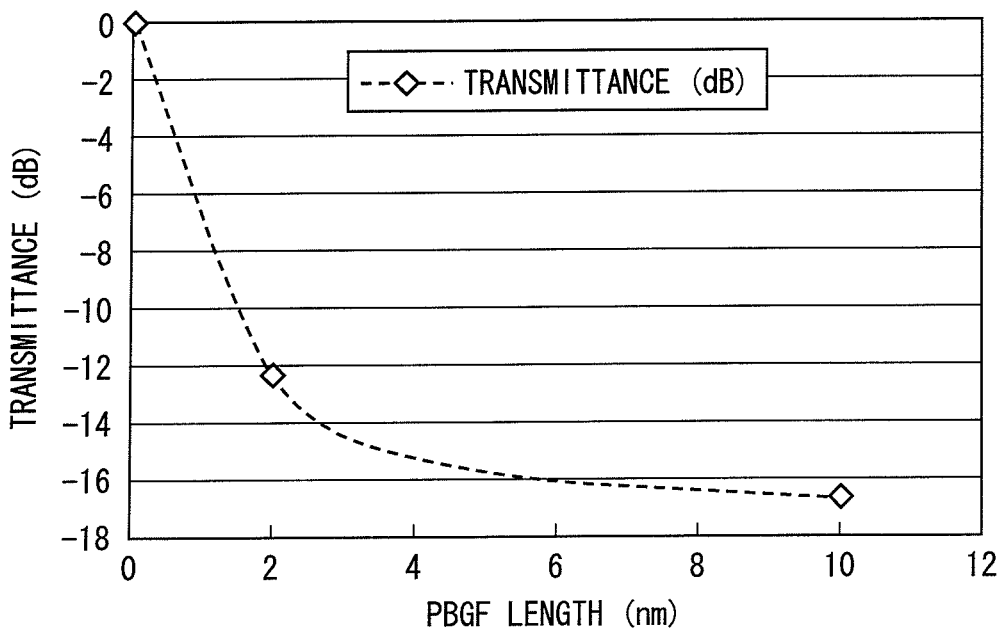
FIG. 9
Figure 10:
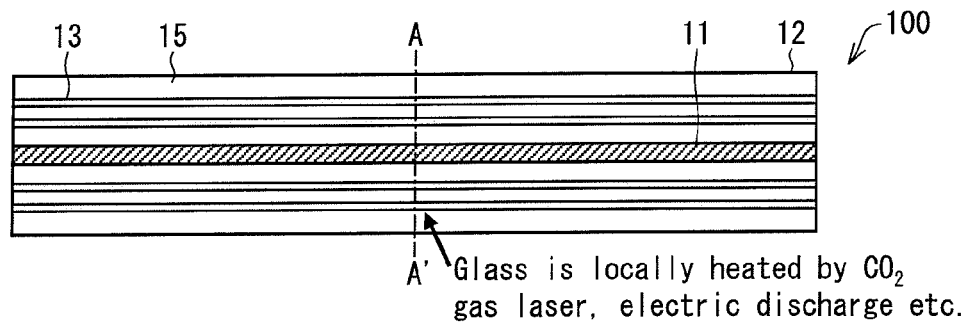
FIG. 10(a)
FIG. 10(b)
Figure 10:
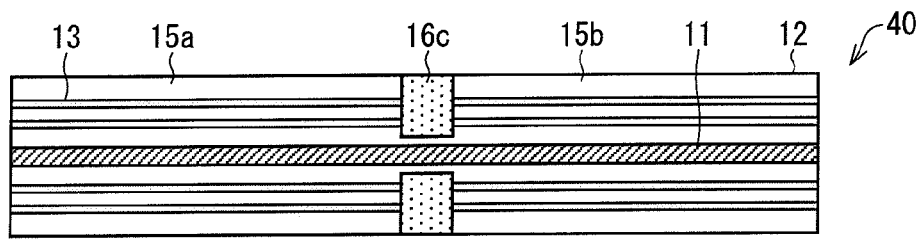
Figure 11:
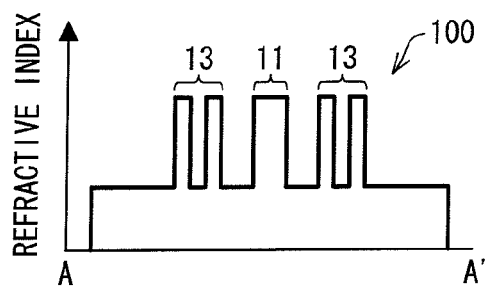
FIG. 11(a)
FIG. 11(b)
FIG. 11(c)
Figure 11:
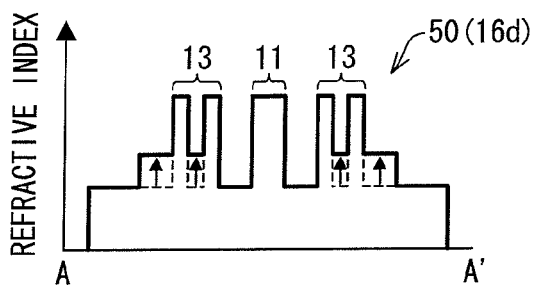
Figure 11:
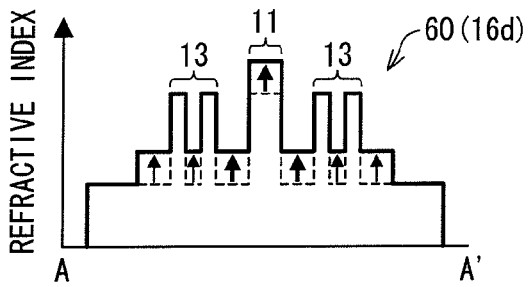

FIG. 9 shows, as an example of such characteristic, the relation between the entire length of the PBGF (hereinafter referred to as a PBGF length) and the transmittance. As indicated in FIG. 9, it was confirmed that the transmittance decrease due to the coupling to the rods 13 almost reached saturation after the light traveled about 2 m.

[4. Filter Characteristic of Optical Fiber-TYPE Optical Filters 20, 30]

Next, transmission loss was examined by using the above-described experimental system under the conditions illustrated in FIGS. 6(a) to 6(c) for the purpose of confirming the filter characteristics of the PBGF 100 illustrated in FIG. 4 and of the optical fiber-type optical filters 20, 30 respectively illustrated in FIGS. 2(a) and 2(b).

FIG. 6(a) is a schematic view of an experiment in the experimental system in a case of measuring an optical fiber-type optical filter of a comparative example employing a conventional PBGF (PBGF 100).

FIG. 6(b) is a schematic view of an experiment of the optical fiber-type optical filter 20, wherein the potion indicated by the cross-shaped symbol is the fusion-spliced section 16a.

FIG. 6(c) is a schematic view of an experiment of the optical fiber-type optical filter 30, wherein the portion between the two cross-shaped symbols is the fiber interposition section 16b.

The PBGF 100 was used as PBGFs for the optical fiber-type optical filters 20, 30.

Figure 7:
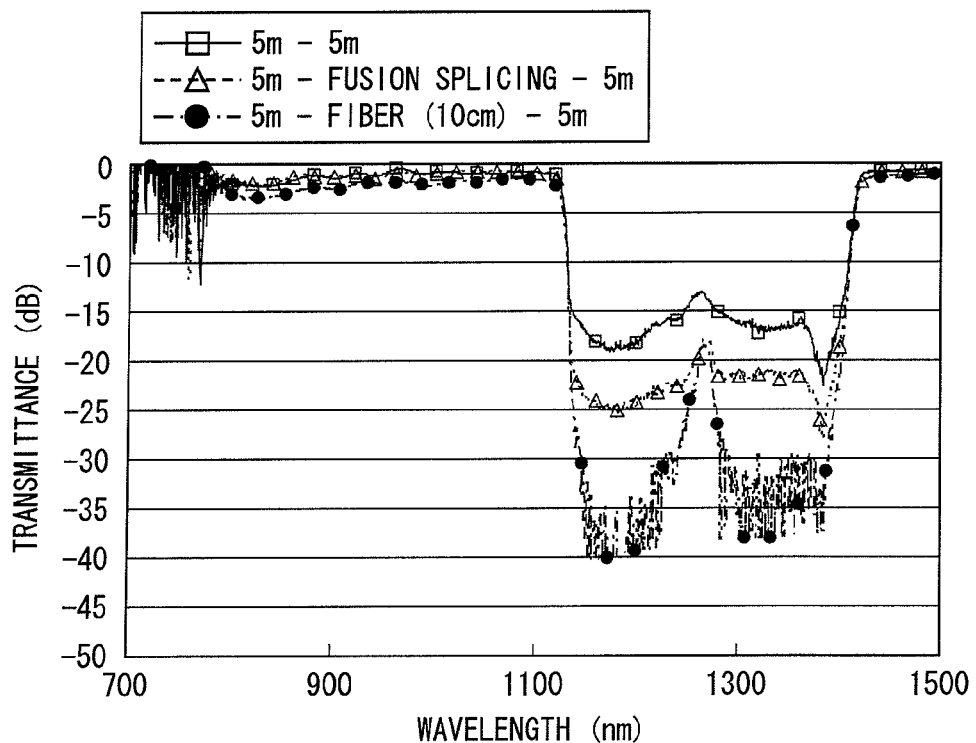
FIG. 7

Next, with reference to FIG. 7, measurement results under the respective conditions illustrated in FIGS. 6(a) to 6(c) will be described as follows. FIG. 7 is a graph of transmission losses (relation between the wavelength and transmittance) under the respective conditions illustrated in FIGS. 6(a) to 6(c). The solid line (line with square-shaped marks) in FIG. 7 indicates the measurement result of the comparative example, the broken line (line with triangle marks) indicates the measurement result of the optical fiber-type optical filter 20, and the chain line (line with black circle marks) indicates the measurement result of the optical fiber-type optical filter 30.

As indicated by the broken line in FIG. 7, it was confirmed that, in the optical fiber-type optical filter 20, part of the rod-guided light P2 was radiated at the fusion-spliced section 16a and that the transmission loss was greater by about 5 dB than the PBGF of the comparative example. Here, the experiment was conducted by rotating one of the PBGFs about the central axis of the core section 11 at an appropriate rotation angle relative to the other of the PBGFs. It was confirmed that the increases in transmission loss were about 5 dB with any rotation angles (including a rotation angle 0°). This indicates that at the time of fusion-splicing of PBGFs there is no need of taking into account the arrangement relation between the rods 13 in the preceding PBGF in the waveguide direction and the rods 13 in the following PBGF e.

Next, in the case where the length of the fiber interposition section 16b was about 10 cm in the optical fiber-type optical filter 30, it was confirmed that the transmission loss was nearly double the transmission loss of the PBGF 100 of the comparative example. This was caused by conversion of large part of the rod-guided light P2 into a radiation mode (radiated light) at the fiber interposition section 16b.

[Relation Between Coating Length and Change in Transmittance]

Figure 8:
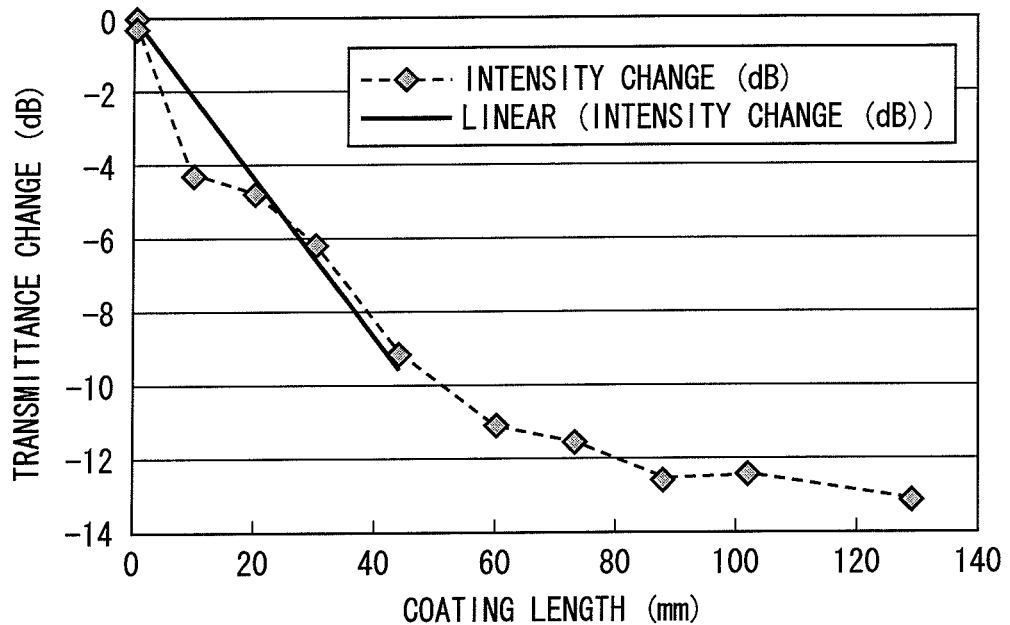
FIG. 8

Next, FIG. 8 shows the relation between the length (coating length) of the fiber interposition section 16b to be interposed between the PBGFs 100s and changes in transmittance. Here, the coating length denotes the length of the fiber interposition section 16b when the fiber interposition section 16b is covered with resin therearound (coated section, not shown).

The resin used for coating the fiber interposition section 16b is a resin having a refractive index equal to or higher than the refractive index of the base material of the clad section 12. For the coating section in this experiment, the same type of acrylate resin as that for a coating for an optical fiber widely used for optical communications was used.

The refractive index of the resin widely used for a coating of a general optical fiber for communications will suffice for the refractive index of the coated section. Use of the resin enables an inexpensive and easy formation of the coated section.

As indicated in FIG. 8, if the fiber interposition section 16b is small in length, the radiated light guided in the clad section 12 is coupled back to the rods 13, resulting in a small change in transmittance.

It was also confirmed that a coating length of 40 mm or more allowed the light guided in the clad section 12 to be sufficiently radiated through the coating.

Since the leak of light to the coated section (with high refractive index) is saturated at a coating length of about 150 mm, the coating length does not need to be more than 150 mm in regard to increasing the transmission loss, although a coating length over 150 mm does not cause a significant problem in the characteristic. However, the light loss region 16 with an excessive length will enlarge the optical fiber-type optical filter 30 (including the optical fiber-type optical filters 40 to 60 to be described later), and therefore complicate the handling of the optical fiber-type optical filter 30 in production. Therefore, the coating length of about 1 m will suffice in general, and there is no need of setting the length to more than 10 m.

FIG. 8 shows only the data in a case where the coated section is present around the fiber interposition section 16b. Similar characteristic will be obtained, however, even in a case with no coated section, although the absolute value of the amount of changes in transmittance will be less.

[Relation Between PBGF Length and Transmittance]

FIG. 9 indicates that the transmittance loss is saturated when the PBGF length is about 2 m or more as described above. That is, in any of the above-described optical fiber-type optical filters 10 to 30 (including the optical fiber-type optical filters 40 to 60 to be described later), the distance from one end on the side different from the side of the light loss region 16 (fusion-spliced section 16a, fiber interposition section 16b, altered section 16c, or refractive-index changed section 16d) to the light loss region 16 is preferably equal to or more than the saturation length (about 2 m). This configuration makes it possible to prevent light guided in the clad section 12 from reaching the light loss region 16 without losing a balance between the intensity of light coupled from the core section 11 to the rods 13 and the intensity of light coupled from the rods 13 to the core section 11. As a result, the loss of the stop band wavelength light P0 can be increased.

Here, the saturation length denotes the distance from where the light to propagate in the core section 11 starts the propagation therein to where the intensity of light coupled from the core section 11 to the rods 13 and the intensity of light coupled from the rods 13 to the core section 11 are balanced.

[5. Specific Example 2 of Light Loss Region 16]

Next, a specific example of the light loss region 16 will be discussed referring to FIGS. 10(a) and 10(b).

FIG. 10(a) is a schematic view illustrating the configuration of a conventional PBGF (PBGF 100).

FIG. 10(b) is a schematic view illustrating the configuration of the optical fiber-type optical filter 40 in which the middle section of the PBGF 100 is heated to alter, thereby forming an altered section (light loss region) 16c.

As indicated in FIG. 10(a), the altered section 16c is formed by heating the middle section of the clad section 12 in the PBGF 100 by means of a carbon dioxide gas laser or electric discharge.

Heating the middle section of the clad section 12 in this way forms the altered region in the clad section 12 in the PBGF region 15, and the rod-guided light P2 guided in the clad section 12 is scattered at the altered region. This makes it possible to increase the transmission loss in the light loss region 16 (altered section 16c). It should be noted, however, that conditions for the irradiation of the carbon dioxide gas laser or the like should be appropriately set so as not to increase the loss at the core section 11.

Thus, in the case of having the altered section 16c as the light loss region 16, it is possible to further increase the transmission loss of the stop band wavelength light P0 since the length of the altered section 16c along the extending direction of the clad section 12 is adjustable.

[6. Specific Example 3 of Light Loss Region 16]

Next, a specific example of the light loss region 16 will be discussed below with reference to FIGS. 11(a) to 11(c).

FIG. 11(a) is a graph showing the refractive-index distribution in the cross-section of the PBGF 100 taken along the line A-A in FIG. 10(a).

FIG. 11(b) is a graph showing the refractive-index distribution in the cross-section (referred to as a refractive-index changed section (light loss region) 16d) of the PBGF 100 taken along the line A-A' in a case where only the refractive-index distribution in the surroundings of the rods 13 is changed (referred to as an optical fiber-type optical filter 50).

FIG. 11(c) is a graph showing the refractive-index distribution in the cross-section (referred to as a refractive-index changed section 16d) taken along the line A-A' in a case where the refractive-index distribution in the surroundings of the rods 13, the core section 11, and the surroundings of the core section 11 (referred to as an optical fiber-type optical filter 60) is changed.

As shown in FIGS. 11(b) and 11(c), a region (refractive-index changed section 16d) in which the refractive index is changed may be formed in the middle section of the clad section 12 in the PBGF 100, as the light loss region 16.

For example, the refractive-index changed section 16d can be formed either by doping a dopant (such as germanium) to part of the region(s) corresponding the core section 11, the surroundings of the core section 11, and/or the surroundings of the rods 13 prior to drawing in the production of a preform of the PBGF 100, or by increasing the amount of the dopant.

Alternatively, a PBGF having a different refractive-index distribution in the PBGF region 15 may be interposed (fusion-spliced) between two PBGFs.

There are following three possible patterns (1) to (3) for the ways in which the refractive-index distribution in the refractive-index changed section 16d is changed.

(1) Increasing the refractive indices between the plurality of rods 13 (see the portions sandwiched between two rods 13 in FIG. 11(b))

(2) Increasing the refractive indices on the outer sides of the plurality of rods 13 (see the portions on the outer sides of the rods 13 in FIG. 11(b))

(3) Increasing the refractive indices of the plurality of rods 13 (not shown)

As indicated in FIG. 11(c), it is preferable that the refractive index of the core section 11 and the refractive indices of the surroundings of the core section 11 be increased to the same extent in the case of increasing the refractive indices of the surroundings of the core section 11. This is due to the fact that, unless the refractive index of the core section 11 and the refractive indices of the surroundings of the core section 11 increase to the same extent, the MFD of the core section-guided light P1 to propagate in the core section 11 changes and therefore light to be kept within the core section 11 is lost.

As described above, in the case of having the light loss region 16 as the refractive-index changed section 16d, it is possible to further increase the transmission loss of the stop band wavelength light P0 since the length of the refractive-index changed section 16d along the extending direction of the clad section 12 is adjustable. Although the optical fiber structures of the first and second PBGF regions 15a, 15b connected to both sides of the light loss region 16 do not necessarily have to be identical, at least partial overlapping of the wavelength of the stop band of the first PBGF and the wavelength of the stop band of the second PBGF improves the saturation characteristic of the transmission loss in the overlapping wavelength. At this time, the optical fiber structures of the first and second PBGF regions 15a, 15b connected to both sides of the light loss region 16 are preferably identical to each other since having the identical optical fiber structures makes it possible to equalize the wavelengths of the stop bands as well as the MFDs of the waveguide modes unevenly distributed in the core sections 11.

The present invention can be also exemplified as follows.

The light loss region of an optical fiber-type optical filter according to the present invention may be a region constituted by an optical fiber which includes a core section extending in the waveguide direction and a clad section extending in the waveguide direction and surrounding the core section, and which is different from the two fiber regions at least in terms of a refractive-index distribution of the clad section.

The light loss region may be a region constituted by an optical fiber which includes a core section extending in the waveguide direction and a clad section extending in the waveguide direction and surrounding the core section, wherein the clad section includes a plurality of high refractive-index sections which have a refractive index higher than that of a base material of the clad section, extend in the waveguide direction, and are arranged periodically in a cross section perpendicular to the waveguide direction, the clad section being formed by modifying a constituent medium of the clad section.

The optical fiber constituting the light loss region may have a homogeneous refractive-index distribution in the clad section.

In the cases of having the above-described regions as the light loss region or in the cases of having the above-described fibers as the optical fiber constituting the light loss region, it is possible to further increase the transmission loss of light in the stop band since the length of the light loss region along the waveguide direction is adjustable.

The light loss region of the optical fiber-type optical filter according to the present invention may be a region in which the mutually-facing end surfaces of the two fiber regions are fusion-spliced to each other.

In the case of having the region in which the end surfaces are fusion-spliced to each other, there is a limitation to the thickness (length) of the fusion-spliced region along the waveguide direction and thus there is also a limitation to the improvement in transmission loss since the thickness cannot be appropriately adjusted. However, it is possible to increase the transmission loss more than that in an optical fiber-type optical filter employing a conventional PBGF.

In the optical fiber-type optical filter according to the present invention, the optical fiber constituting the light loss region may further include a coated section surrounding the clad section and having a refractive index equal to or higher than the refractive index of the base material of the clad section.

In the case of having such coated section, light guided in the clad section in the light loss region leaks out to the coated section. It therefore becomes possible to further increase the transmission loss of light in the stop band.

In addition to the above-described configurations, the optical fiber-type optical filter according to the present invention may be such that the coated section is 40 mm or longer in length along the waveguide direction.

If the coated section formed around the light loss region is 40 mm or longer in length, large part of light guided in the clad section can be lost as radiation light.

In the optical fiber-type optical filter according to the present invention, the optical fiber constituting the light loss region is preferably equal to one of the two fiber regions in terms of a mode field diameter of a waveguide mode with respect to a predetermined wavelength outside a stop band, the waveguide mode being such that a light intensity is concentrated in the core section, and the stop band being a wavelength band of light to be filtered off by transmission loss.

Here, MFD (mode field diameter) generally indicates a diameter of an electric field distribution in a waveguide mode which electric field distribution is caused by light propagating in the core section in the waveguide mode.

According to this configuration, light outside the stop band among light guided in the optical fiber-type optical filter is propagated in the optical fiber-type optical filter in a waveguide mode in which the light intensity is concentrated in the core section. Consequently, by equalizing the optical fiber constituting the light loss region with one of the two fiber regions in terms of a mode field diameter of a waveguide mode with respect to a predetermined wavelength (the wavelength of light to be guided in the core) outside a stop band, the waveguide mode being such that a light intensity is concentrated in the core section, and the stop band being a wavelength band of light to be filtered off by transmission loss, it becomes possible to reduce loss of light outside the stop band,
the loss occurring at a connection section between one of the two fiber regions and the light loss region.

In the optical fiber-type optical filter according to the present invention, the two fiber regions may have identical optical fiber structures.

This makes it possible to obtain a large transmission loss in the stop band without using an optical fiber having a periodic structure region with a different structure.

In the optical fiber-type optical filter according to the present invention, wherein one of the two fiber regions has a length equal to or more than a saturation length, where the length is a length from the light loss region to an end, not associated with the light loss region, of the one of the two fiber regions.

The saturation length is a distance from where the light to propagate in the core section in the one of the two fiber regions starts the propagation to where an intensity of light coupled from the core section to the high refractive-index sections and an intensity of light coupled from the high refractive-index sections to the core section are balanced.

This configuration makes it possible to prevent light guided in the clad section from reaching the light loss region without losing a balance between the intensity of light coupled from the core section to the high refractive-index sections and the intensity of light coupled from the high refractive-index sections to the core section. As a result, the loss of light within the stop band can be increased.

[Additional Matter]

The present invention is not limited to the above-described embodiments but allows various modifications within the scope of the claims. Any embodiment obtained by appropriately combining the technical means disclosed in the different embodiments will also be included in the technical scope of the present invention.

Industrial Applicability

The present invention is applicable to an optical filter for filtering undesired wavelength such as naturally radiated light emitted from a fiber for light amplification used for an optical fiber amplifier or a laser or the like. The present invention is particularly readily applicable to an optical filter in which an excellent transmission loss property is required.

REFERENCE SIGNS LIST

1: WHITE LIGHT SOURCE
2: FIRST OPTICAL SWITCH
3: SECOND OPTICAL SWITCH
4: OPTICAL SPECTRUM ANALYZER
10 TO 60: OPTICAL FIBER-TYPE OPTICAL FILTER
11: CORE SECTION
12: CLAD SECTION
13: ROD (HIGH REFRACTIVE-INDEX SECTION)
14: BACKGROUND MEDIUM (BASE MATERIAL)
15: PBGF REGION
15a: FIRST PBGF REGION (FIBER REGION)
15b: SECOND PBGF REGION (FIBER REGION)
16: LIGHT LOSS REGION
16a: FUSION-SPLICED REGION (LIGHT LOSS REGION)
16b: FIBER INTERPOSITION SECTION (LIGHT LOSS REGION)
16c: ALTERED SECTION (LIGHT LOSS REGION)
16d: REFRACTIVE-INDEX CHANGED SECTION (LIGHT LOSS REGION)
100: PBGF
d1: CORE DIAMETER
d2: CLAD DIAMETER d3: ROD DIAMETER
l: ROD INTERVAL (PREDETERMINED INTERVAL)
P0: STOP BAND WAVELENGTH LIGHT (LIGHT)
P1, P1': CORE SECTION-GUIDED LIGHT (LIGHT)
P2, P2': ROD-GUIDED LIGHT (LIGHT)

The invention claimed is:

1. An optical fiber-type optical filter comprising:
two fiber regions, each of which includes:
a core section extending in a waveguide direction of incident light; and
a clad section extending in the waveguide direction and surrounding the core section, wherein the clad section includes a plurality of high refractive-index sections which have a refractive index higher than that of a base material of the clad section, extend in the waveguide direction, and are arranged periodically in a cross section perpendicular to the waveguide direction, and
a light loss region between mutually-facing end surfaces of the two fiber regions, for coupling a radiation mode with a waveguide mode in which light intensity is observed in the high refractive-index sections in the clad section.

2. The optical fiber-type optical filter according to claim 1, wherein the light loss region is a region constituted by an optical fiber which includes a core section extending in the waveguide direction and a clad section extending in the waveguide direction and surrounding the core section, and which is different from the two fiber regions at least in terms of a refractive-index distribution of the clad section.

3. The optical fiber-type optical filter according to claim 2, wherein the optical fiber constituting the light loss region has a homogeneous refractive-index distribution in the clad section.

4. The optical fiber-type optical filter according to claim 2, wherein the optical fiber constituting the light loss region further includes a coated section surrounding the clad section and having a refractive index equal to or higher than a refractive index of a base material of the clad section.

5. The optical fiber-type optical filter according to claim 4, wherein the coated section is 40 mm or longer in length along the waveguide direction.

6. The optical fiber-type optical filter according to claim 2, wherein the optical fiber constituting the light loss region is equal to one of the two fiber regions in terms of a mode field diameter of a waveguide mode with respect to a predetermined wavelength outside a stop band, the waveguide mode being such that a light intensity is concentrated in the core section, and the stop band being a wavelength band of light to be filtered off by transmission loss.

7. The optical fiber-type optical filter according to claim 1, wherein the light loss region is a region constituted by an optical fiber which includes a core section extending in the waveguide direction and a clad section extending in the waveguide direction and surrounding the core section, wherein the clad section includes a plurality of high refractive-index sections which have a refractive index higher than that of a base material of the clad section, extend in the waveguide direction, and are arranged periodically in a cross section perpendicular to the waveguide direction, the clad section being formed by modifying a constituent medium of the clad section.

8. The optical fiber-type optical filter according to claim 1, wherein the light loss region is a region in which the mutually-facing end surfaces of the two fiber regions are fusion-spliced to each other.

9. The optical fiber-type optical filter according to claim 1, wherein one of the two fiber regions has a length equal to or more than a saturation length, where the length is a length from the light loss region to an end, not associated with the light loss region, of the one of the two fiber regions, and the saturation length is a distance from where the light to propagate in the core section in the one of the two fiber regions starts the propagation to where an intensity of light coupled from the core section to the high refractive-index sections and an intensity of light coupled from the high refractive-index sections to the core section are balanced.

10. The optical fiber-type optical filter according to claim 2, wherein one of the two fiber regions has a length equal to or more than a saturation length, where the length is a length from the light loss region to an end, not associated with the light loss region, of the one of the two fiber regions, and the saturation length is a distance from where the light to propagate in the core section in the one of the two fiber regions starts the propagation to where an intensity of light coupled from the core section to the high refractive-index sections and an intensity of light coupled from the high refractive-index sections to the core section are balanced.

11. The optical fiber-type optical filter according to claim 7, wherein one of the two fiber regions has a length equal to or more than a saturation length, where the length is a length from the light loss region to an end, not associated with the light loss region, of the one of the two fiber regions, and the saturation length is a distance from where the light to propagate in the core section in the one of the two fiber regions starts the propagation to where an intensity of light coupled from the core section to the high refractive-index sections and an intensity of light coupled from the high refractive-index sections to the core section are balanced.

12. The optical fiber-type optical filter according to claim 8, wherein one of the two fiber regions has a length equal to or more than a saturation length, where the length is a length from the light loss region to an end, not associated with the light loss region, of the one of the two fiber regions, and the saturation length is a distance from where the light to propagate in the core section in the one of the two fiber regions starts the propagation to where an intensity of light coupled from the core section to the high refractive-index sections and an intensity of light coupled from the high refractive-index sections to the core section are balanced.

13. The optical fiber-type optical filter according to claim 1, wherein the two fiber regions have identical optical fiber structures.

14. The optical fiber-type optical filter according to claim 2, wherein the two fiber regions have identical optical fiber structures.

15. The optical fiber-type optical filter according to claim 7, wherein the two fiber regions have identical optical fiber structures.

16. The optical fiber-type optical filter according to claim 8, wherein the two fiber regions have identical optical fiber structures.

* * * * *